United States Patent
Tsujimura

(10) Patent No.: US 7,600,779 B2
(45) Date of Patent: Oct. 13, 2009

(54) AIRBAG SYSTEM

(75) Inventor: Norihisa Tsujimura, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 40 days.

(21) Appl. No.: 11/818,063

(22) Filed: Jun. 13, 2007

(65) Prior Publication Data

US 2007/0284860 A1 Dec. 13, 2007

(30) Foreign Application Priority Data

Jun. 13, 2006 (JP) .............................. 2006-163658

(51) Int. Cl.
*B60R 21/21* (2006.01)
(52) U.S. Cl. ............... 280/730.2; 280/728.2; 280/730.1
(58) Field of Classification Search ............. 280/730.2, 280/743.1, 756, 728.2, 730.1
See application file for complete search history.

(56) References Cited

U.S. PATENT DOCUMENTS

| | | | | |
|---|---|---|---|---|
| 5,056,816 A * | 10/1991 | Lutze et al. | .................. | 280/751 |
| 5,074,583 A * | 12/1991 | Fujita et al. | .............. | 280/730.1 |
| 5,626,361 A * | 5/1997 | Heiner | ........................ | 280/756 |
| 5,641,193 A * | 6/1997 | Zepnik et al. | .......... | 296/107.09 |
| 5,906,393 A * | 5/1999 | Mazur et al. | ................. | 280/735 |
| 6,024,377 A * | 2/2000 | Lane, Jr. | ................... | 280/728.3 |
| 6,086,091 A * | 7/2000 | Heinz et al. | .............. | 280/728.3 |
| 6,817,626 B2 * | 11/2004 | Boll et al. | ................. | 280/730.1 |
| 7,380,821 B2 * | 6/2008 | Higuchi | .................... | 280/743.1 |
| 7,384,067 B2 * | 6/2008 | Parks et al. | .................. | 280/756 |
| 2003/0193176 A1* | 10/2003 | Ott et al. | ..................... | 280/735 |
| 2005/0161921 A1* | 7/2005 | Higuchi | ..................... | 280/735 |

FOREIGN PATENT DOCUMENTS

| | | | |
|---|---|---|---|
| DE | 4426733 A1 * | 2/1995 | |
| DE | 19806766 A1 * | 8/1999 | |
| DE | 10063765 A1 * | 7/2002 | |
| JP | 5-139232 | 6/1993 | |
| WO | WO 0144026 A1 * | 6/2001 | |

OTHER PUBLICATIONS

Machine English Translation of DE10063765A1.*
Machine English Translation of DE19806766A1.*
Patent Abstracts of Japan for Japanese Publication No. 05-139232, Publication date Jun. 8, 1993 (2 pages).

* cited by examiner

*Primary Examiner*—Paul N. Dickson
*Assistant Examiner*—George D. Spisich
(74) *Attorney, Agent, or Firm*—Osha • Liang LLP

(57) ABSTRACT

An air bag system for a vehicle. The air bag system includes an air bag body and an adjustment unit. The air bag body is configured to deploy upon input of shock to a vehicle. The adjustment unit is configured to move a position of the air bag body between a lower position and an upper position.

12 Claims, 6 Drawing Sheets

AIRBAG SYSTEM

PRIORITY APPLICATION

This application claims priority from Japanese Patent Application No. 2006-163658, filed Jun. 13, 2006, the contents of which are hereby incorporated by reference in their entirety

BACKGROUND

1. Field of the Invention

The present invention relates to a side air bag system that protects a side of an occupant's head at a side crash or a rollover of a vehicle, and, more particularly to a side air bag system for head protection, applied to a vehicle whose roof can be folded down.

2. Description Of The Related Art

An air bag system is often provided in a vehicle interior to protect the occupant's head in an emergency such as a collision and a rollover. In a convertible roof vehicle when the roof is closed, the occupant is seated with his/her head slightly tilted downward due to a small overhead space in a closed-roof condition, especially if the occupant is in the rear seat of the vehicle. When the roof is open, the occupant is usually seated with his/her head lifted in a normal sitting posture. Accordingly, an occupant's head position depends in large part on whether the roof is closed or open.

In order to adapt the air bag system to the open-roof and closed-roof conditions respectively, the air bag system in the related art has to be separately provided at the respective positions corresponding to the above two head positions where the occupant's head tilts downward when the roof is closed and the occupant's head is lifted when the roof is open. Such an installation structure in which the air bag systems are separately provided at upper and lower positions is disclosed, for example, in Japanese Patent Provisional Publication No. 5-139232 ("JP 5-139232").

In JP 5-139232, an air bag system having an upper air bag and a lower air bag is provided in the interior. In more detail, the upper and lower air bags are installed at an interior side of a side door of a normal vehicle, namely the vehicle whose roof is fixedly provided, to be spaced apart from each other at a predetermined distance.

SUMMARY OF THE INVENTION

In accordance with embodiments of the present invention, an air bag system The air bag system includes an air bag body and an adjustment unit. The air bag body is configured to deploy upon input of shock to the vehicle. The adjustment unit is configured to move a position of the air bag body between a lower position and an upper position.

Other aspects and advantages of the invention will be apparent from the following description and the appended claims.

DETAILED DESCRIPTION

Embodiments of the present invention relate generally to an air bag system for head protection. The air bag system can be adapted to different occupant head positions in upward and downward directions. The adaptation to different occupant head positions may depend, entirely or in part, on whether the vehicle roof is open or closed. The adaptation may be accomplished using one air bag system by way of an upward and downward movement of the air bag system. By providing a single air bag system, the production costs of multiple air bags associated with the related art may be avoided.

Hereinafter, embodiments of the present invention will be described in detail with reference to the drawings.

Figure 1:
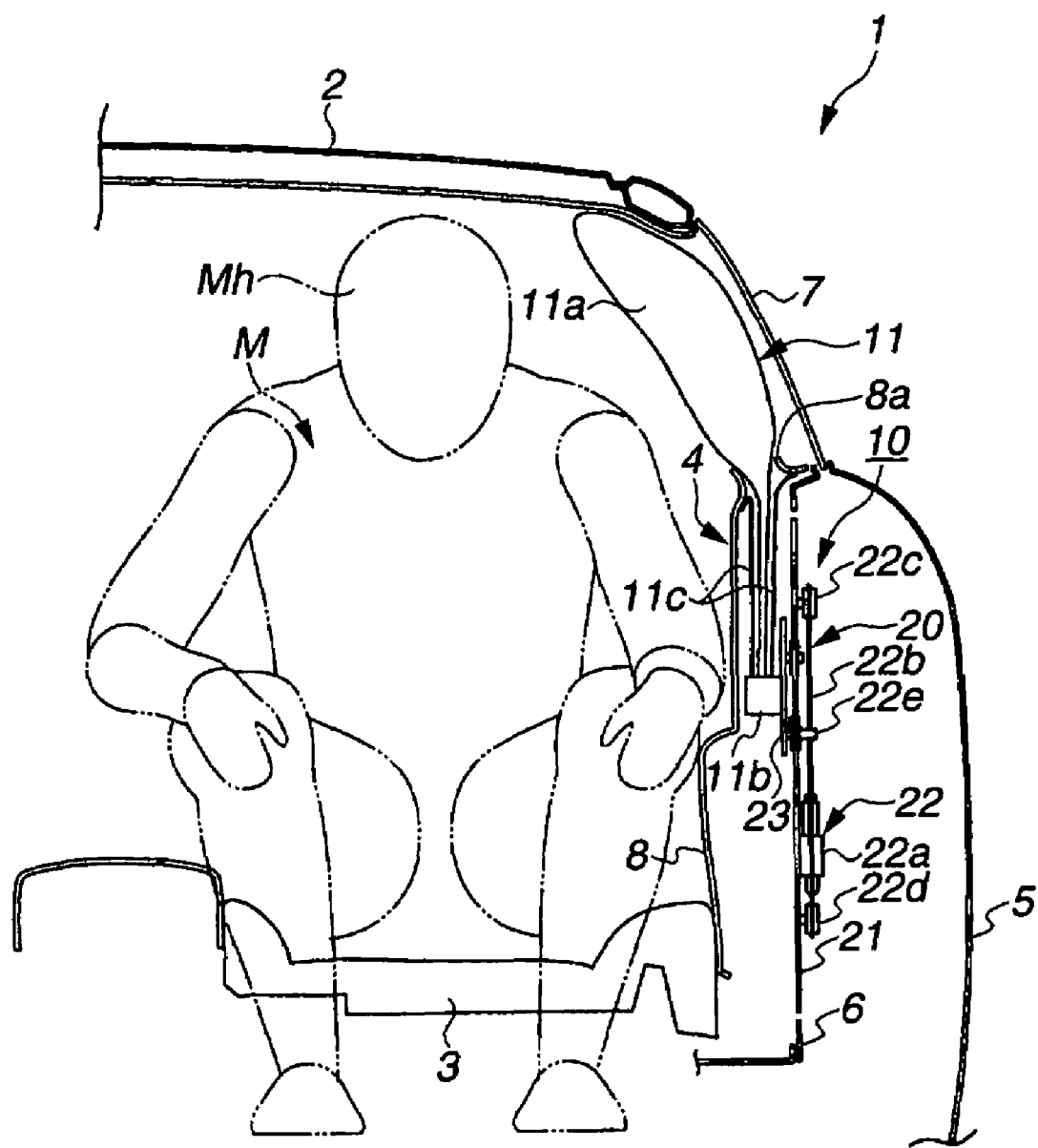
FIG. 1 is a front sectional view of a main part of a side air bag system according to a first embodiment of the present invention, showing deployment of an air bag body under a closed-roof condition.
Figure 2:
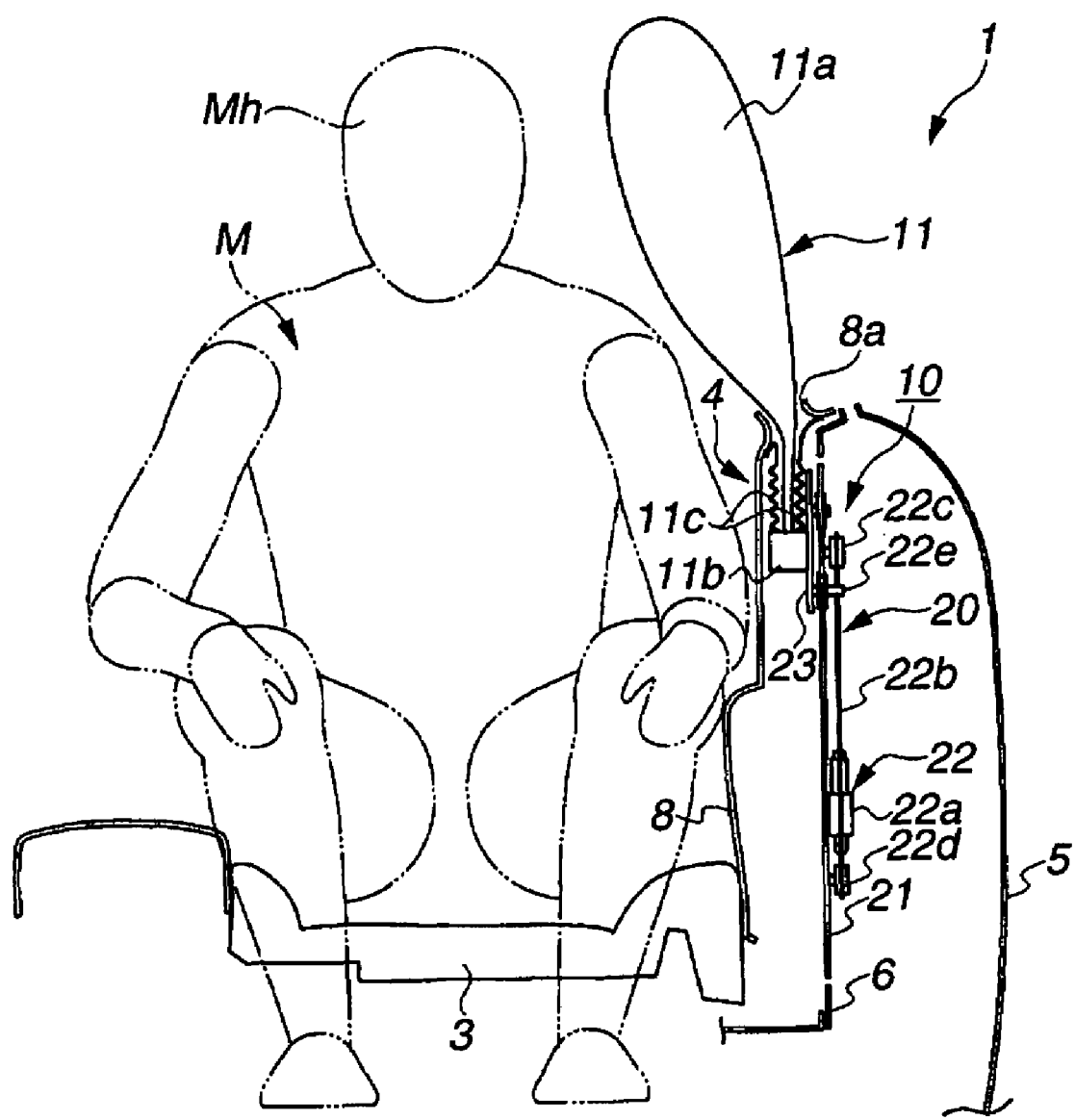
FIG. 2 is a front sectional view of the main part of the side air bag system according to the first embodiment, showing deployment of the air bag body under an open-roof condition.

In FIGS. 1 to 5, a side air bag system is shown in accordance with an embodiment of the present invention. As illustrated in FIGS. 1 and 2, a side air bag system (or apparatus) 10 according to this particular embodiment is applied to a side air bag system for protection of an occupant "M" seated in a back seat 3 of a vehicle 1 whose roof 2 can open and close, such as a convertible. The side air bag system 10 is provided at a rear side portion 4 that is an interior side portion located at a side of the back seat 3.

In one embodiment, an open/close switch (not shown) for opening and closing roof 2 is provided at a position close to a driver's seat (not shown), such as, for example, an instrument panel. By way of operation of this open/close switch, a roof open/use signal is output (or sent) and the roof 2 is selectively opened or closed.

The rear side portion 4 is formed by both a rear fender 5 shaped to form part of the outside of the vehicle body and a rear side inner panel 6 spaced a predetermined distance from the rear fender 5 in an inward direction of the vehicle body, and then a double wall is formed. Between the rear fender 5 and the rear side inner panel 6, the rear side window glass 7 may be installed and made to move up and down.

The interior side of the rear side inner panel 6 is covered with the rear side trim 8. The side air bag system 10 is installed between the side inner panel 6 and the rear side trim 8. The side air bag system 10 has an air bag body 11a as an air bag module 11, an air bag case 11b that accommodates the folded air bag body 11a, and an inflator 12 (see FIG. 3) that functions upon side collision or rollover of the vehicle to supply gas or gas pressure to the air bag body 11a. The side air bag system 10 may be configured to deploy the bag-shaped air bag body 11a during a side collision or a rollover of the vehicle to protect a head "MHz" of the occupant "M."

In the embodiment shown in FIGS. 1-5, the side air bag system 10 employs a hoisting and lowering unit or device (hereinafter "adjustment unit") 20 that can change an up-and-down position of side air bag system 10 in accordance with the whether the roof is open or closed. The side air bag system 10 is positioned in an upper position when the roof 2 is opened and is positioned in a lower position when the roof 2 is closed. In one embodiment, the position of the side air bag system 10 may adjust according to a sensed location of the occupant's head and independent of the roof position.

Figure 3:
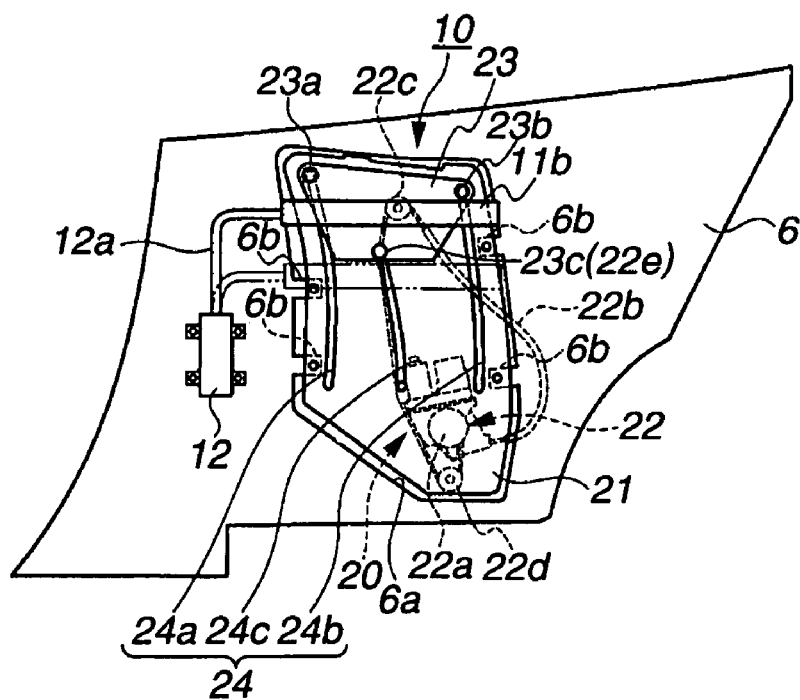
FIG. 3 is a front view of the side air bag system according to the first embodiment, viewed from an interior side of a vehicle, showing installation structure of the side air bag system.
Figure 4:
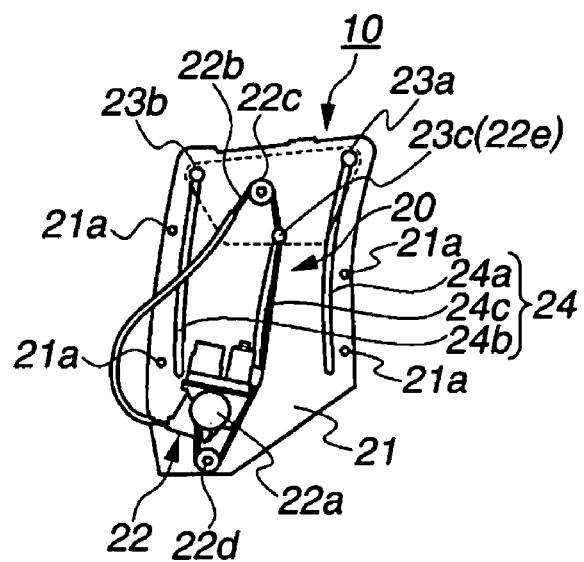
FIG. 4 is a rear view of the side air bag system according to the first embodiment, viewed from outside of the vehicle.

The adjustment unit 20 shown in FIGS. 3 and 4 includes a base plate 21 secured to an opening section 6a formed on the rear side inner panel 6, a regulator 22 installed on the base plate 21, a hoisting plate 23 that secures air bag case 11b, and a guide rail portion 24 formed in the base plate 21. The guide rail portion 24 guides the hoisting plate 23 upward and downward.

The opening section 6a may be formed into a substantially rectangular shape from an upper portion to a lower portion of the rear side inner panel 6. The base plate 21 may be formed substantially along an inside shape of the opening section 6a. Then, an edge section of the base plate 21 may be secured to a plurality of mounting pieces 6b that protrude inwardly from an edge portion of the opening section 6a via mounting holes 21a with a fastening member, such as a screw or a clip.

The regulator 22 may be configured as a wire drum-type regulator, such as those commonly used for a door window in a vehicle. A wire 22b may be wound around a motor-driven drum 22a. One end side of the wire 22b may be wound around the drum 22a while the other end is being unreeled from the drum 22a when drum 22a rotates in a forward or reverse direction.

Continuing with the above embodiment, the wire 22b rotates around pulleys 22c and 22d respectively attached to upper and lower portions of the base plate 21.

The wire 22b is fixed to hoisting plate 23 at a fixing point 22e between the pulleys 22c and 22d. The hoisting plate 23 is moved up and down by way of rotation in the forward and reverse directions of the drum 22a. Here, as can be seen in FIGS. 1 and 2, the regulator 22 is located at an outer side of the base plate 21, while the hoisting plate 23 is located at an inner side (interior side) of the base plate 21.

The guide rail portion 24 may be formed by three slits 24a, 24b and 24c at both side sections and the middle section in front-and-rear width direction of the vehicle on the base plate 21 and extend in upward and downward directions. The hoisting plate 23 may then be slidably secured to the guide rail portion 24 by the guide rollers 23a, 23b and 23c, which are slidably fitted or engaged into the slits 24a, 24b and 24c respectively. In one embodiment, the guide roller 23c also functions as the fixing point 22e.

The above embodiment may be configured to operate as follows. When the drum 22a of the regulator 22 rotates, for instance, in the forward direction, the one end side of the wire 22b is wound around the drum 22a, and the hoisting plate 23 rises (the hoisting plate 23 is pulled upwardly by the wire 22b through the fixing point 22e).

The side air bag system 10 secured to the hoisting plate 23 can therefore be moved upwardly. On the other hand, when the drum 22a rotates in the reverse direction, the other end side of the wire 22b is wound up around the drum 22a, and the hoisting plate 23 is lowered (the hoisting plate 23 is pulled downwardly by the wire 22b through the fixing point 22e). The side air bag system 10 can therefore be moved downwardly.

In the embodiment shown in FIG. 3, the inflator 12 is installed on the rear side inner panel 6, and the inflator 12 and the air bag body 11a inside the air bag case 11b are in communication with each other through a tube 12a. Although the side air bag system 10 moves up and down under a condition in which the inflator 12 is secured or fixed to the rear side inner panel 6, since the tube 12a is formed of a flexible and extendable or elastic material, the inflator 12 can therefore supply the gas to the air bag body 11a smoothly and properly regardless of the up-and-down position of the side air bag system 10.

The adjustment unit 20 may be configured to work with the open/close switch of roof 2. That is, by the operation of the open/close switch, the side air bag system 10 may be positioned in the upper position by the adjustment unit 20 when the roof 2 is opened, while the side air bag system 10 is positioned in the lower position when the roof 2 is closed.

In more detail, the regulator 22 is driven by a switching signal of the open/close switch, and the drum 22a rotates in the forward direction by the signal that opens the roof 2 and thereby lifts up the hoisting plate 23. On the other hand, the drum 22a rotates in the reverse direction by the signal that closes the roof 2 and thereby lowers the hoisting plate 23. As a matter of course, a limiter (not shown) for limiting the movement of the hoisting plate 23 is provided in the adjustment unit 20, then the rotation of the drum 22a is stopped at the top and bottom positions of the hoisting plate 23.

As illustrated in FIGS. 1 and 2, the side air bag system 10 may be configured so that the air bag body 11a pushes and opens an air bag opening 8a, which is a slit or a thinner portion formed at a top end portion of the rear side trim 8, and deploys toward a side of the occupant's head "Mh" when the air bag body 11a has been inflated.

Between the air bag opening 8a and the air bag case 11b, a bag-deployment guide 11c having flexibility such as a non-woven fabric may be provided.

The bag-deployment guide 11c may be installed inside the rear side trim 8 so that the bag-deployment guide 11c covers both the right and left sides of the deploying air bag body 11a. More specifically, as shown in FIG. 1, in the case where the hoisting plate 23 is located in the lower position, namely that the air bag case 11b is positioned at the lower position, the bag-deployment guide 11c extends. On the other hand, as shown in FIG. 2, in the case where the hoisting plate 23 is located in the upper position, namely that the air bag case 11b is positioned at the upper position, the bag-deployment guide 11c retracts.

Figure 5A:
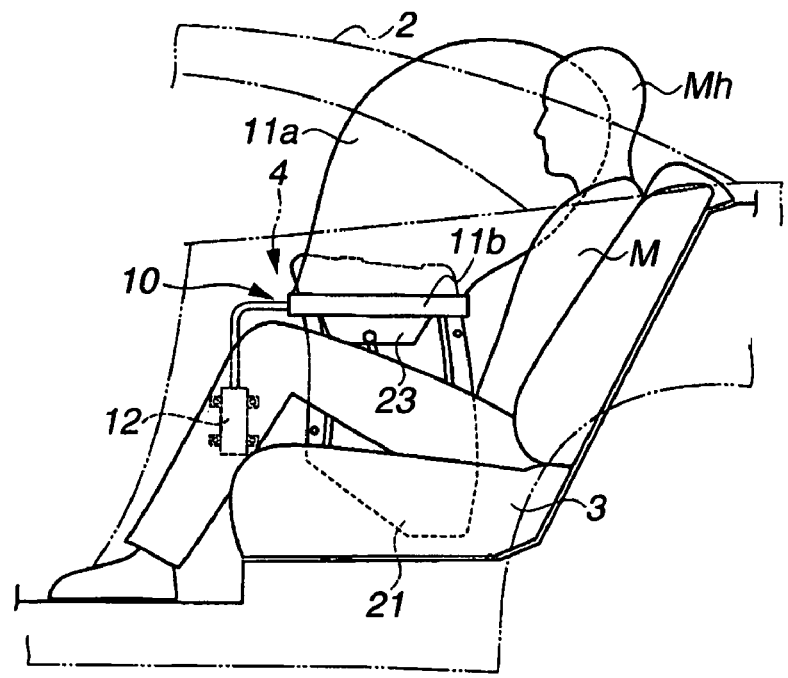
FIGS. 5A and 5B are side views showing the relationship between an occupant and the side air bag system under (5A) the open-roof condition and (5B) the closed-roof condition, in the first embodiment.
Figure 5B:
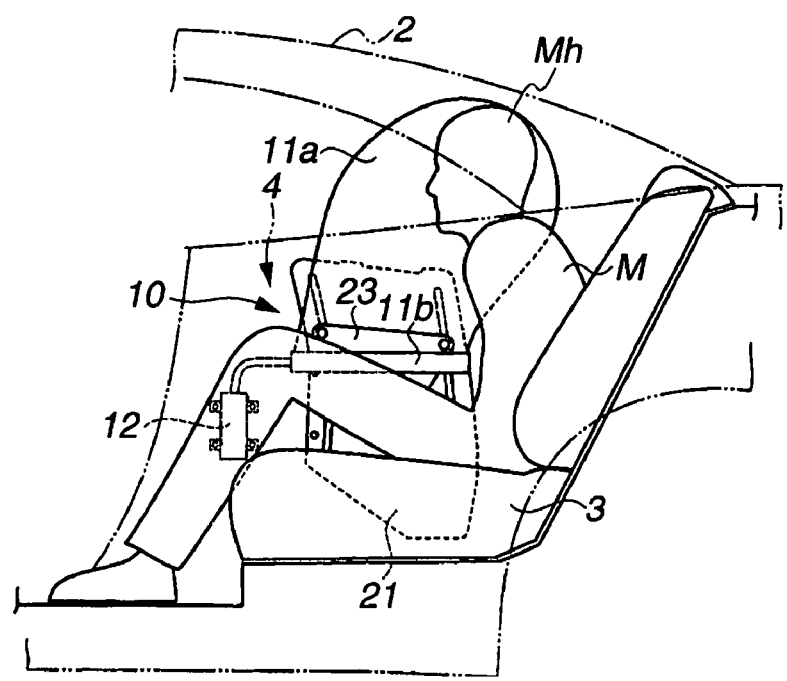

The side air bag system 10 for head protection in accordance with embodiments of the invention makes it possible to change the up-and-down position of the side air bag system 10 in accordance with whether the roof is open or closed by providing the adjustment unit 20. That is, when the roof 2 is opened when the occupant's head "Mh" is positioned in a high position as shown in FIG. 5A, the side air bag system 10 can be located in the upper position. On the other hand, as shown in FIG. 5B, when the roof 2 is closed when the occupant's head "Mh" is positioned in a low position, the side air bag system 10 can be located in the lower position. Accordingly, the side air bag system 10 can be adapted to the difference in the up-and-down position of the occupant's head "Mh" while using a single side air bag system.

When the roof is closed as shown in FIGS. 1 and 5B, upon side collision or rollover of the vehicle, the air bag body 11a of the side air bag system 10 located in the lower position deploys between the occupant's head "Mh" and a side portion of the interior, for instance, the rear side window glass 7 or a side portion of the roof 2, and protects the occupant's head "Mh." In this manner, protection of the occupant's head can be improved.

Further, since the deployment position of the air bag body 11a can be adapted to the difference in the up-and-down position of the occupant's head "Mh," as compared with a case where the up and down positions of the occupant's head "Mh" in the open-roof and closed-roof conditions are covered by one large air bag having a large protection area, upsizing of the air bag system due to a requirement for a large or increased capacity of the air bag body can be prevented.

In addition, since the deployment position of the air bag body 11a can be adapted to the difference in the up-and-down position of the occupant's head "Mh," as compared with a case where the air bag having the large protection area is installed on the basis of the occupant's head position with the roof open, interference with the roof when the air bag body deploys with the roof closed is avoided, thereby reducing the risk that a undesired deployment shape will occur.

Furthermore, when the roof is open as shown in FIGS. 2 and 5A, upon side collision or rollover of the vehicle, the air bag body 11a of the side air bag system 10 located in the upper position deploys between the occupant's head "Mh" and a side-colliding object (not shown) or road surface at the rollover, and protects the occupant's head "Mh." In this manner, protection of the occupant's head can be improved.

Moreover, in embodiments in which the adjustment unit 20 works with the open/close switch of roof 2, the side air bag system 10 can be positioned with certainty in the upper position when the roof 2 is opened, while the side air bag system 10 can be positioned with certainty in the lower position when the roof 2 is closed. Thus, it is possible to prevent an accidental operating or setting mistake of the adjustment unit 20, thereby improving protection of the occupant's head in accordance with whether the roof is open or closed.

Figure 6:
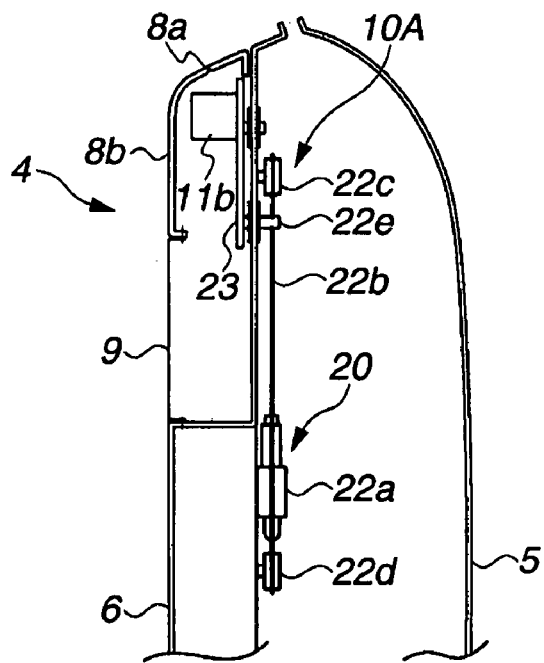
FIG. 6 shows a front sectional view of an adjustment unit of a side air bag system according to a second embodiment, when the side air bag system is positioned in an upper position.
Figure 7:
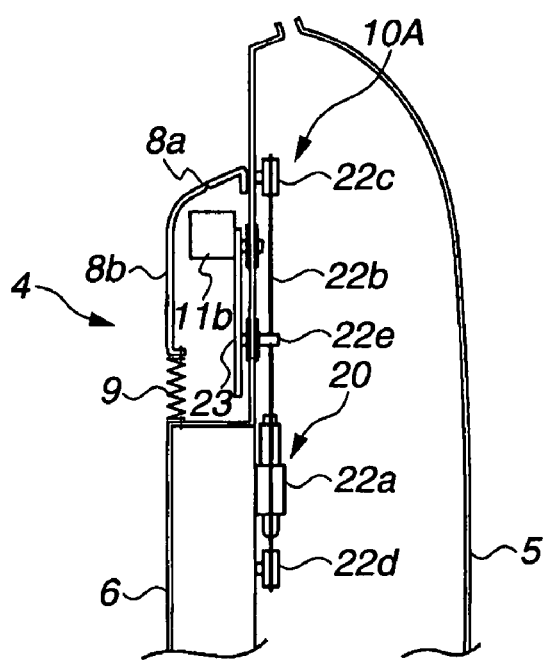
FIG. 7 shows a front sectional view of the adjustment unit of the side air bag system according to the second embodiment, when the side air bag system is positioned in a lower position.

Turning to FIGS. 6 and 7, a side air bag system in accordance with another embodiment of the present invention is shown. In the following, the same components as the embodiment shown in FIGS. 1-5 are denoted by the same reference numbers, and an explanation of these components is omitted. FIG. 6 is a front sectional view of the adjustment unit when the side air bag system is positioned in the upper position. FIG. 7 is a front sectional view of the adjustment unit when the side air bag system is positioned in the lower position.

As illustrated in FIGS. 6 and 7, a configuration of a side air bag system 10A is basically the same as the side air bag system 10 of the above embodiment. In the same manner as the first embodiment, the side air bag system 10A is configured so that the hoisting plate 23 to which the side air bag system 10A (the air bag body 11a) is attached is moved up and down by the regulator 22 according to whether the roof is open or closed. In addition, the air bag body 11a ruptures or breaks the air bag opening 8a formed as a weak or fragile part at the top end portion of the rear side trim 8 and deploys in an emergency, such as side collision or rollover of the vehicle.

In the embodiment shown in FIGS. 6 and 7, an arm rest portion 8b that covers the hoisting plate 23 separates from the rear side trim 8. The arm rest portion 8b is linked with the hoisting plate 23 and configured to move up and down integrally with side air bag system 10A (hoisting plate 23).

As illustrated in FIGS. 6 and 7, an interior cover 9 is made to be flexible and arranged to cover an area between a bottom of arm rest portion 8b and the rear side inner panel 6. When the arm rest portion 8b is located in the upper position together with the hoisting plate 23 as shown in FIG. 6, the interior cover 9 extends. On the other hand, as shown in FIG. 7, when the arm rest portion 8b is located in the lower position together with the hoisting plate 23, the interior cover 9 compresses by folding like a bellows.

Since the arm rest portion 8b moves up and down integrally with the hoisting plate 23, a distance between the side air bag system 10A attached to the hoisting plate 23 and the air bag opening 8a formed at the top end portion of the rear side trim 8 remains constant. Thus, the side air bag system 10A is always positioned close to the air bag opening 8a. Accordingly, the air bag body 11a can be deployed from the air bag opening 8a accurately without the use of the bag-deployment guide 11c shown in the embodiment of FIGS. 1-5. Furthermore, because of the constant distance between the side air bag system 10A and the air bag opening 8a, it is possible to set a projection amount of the air bag body 11a from the arm rest portion 8b at the instant of deployment to be constant without reference to the up-and-down position of the side air bag system 10A.

Figure 8:
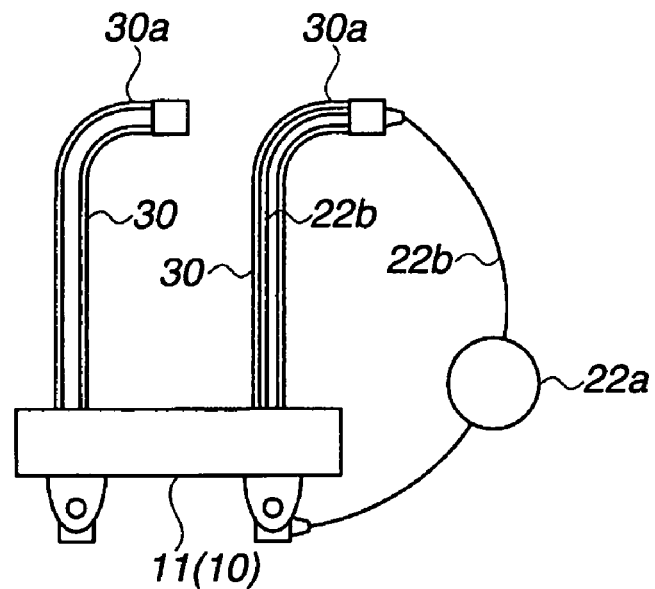
FIG. 8 shows a front view of a guide rail portion of a side air bag system according to a third embodiment, when the side air bag system is positioned in the lower position.
Figure 9:
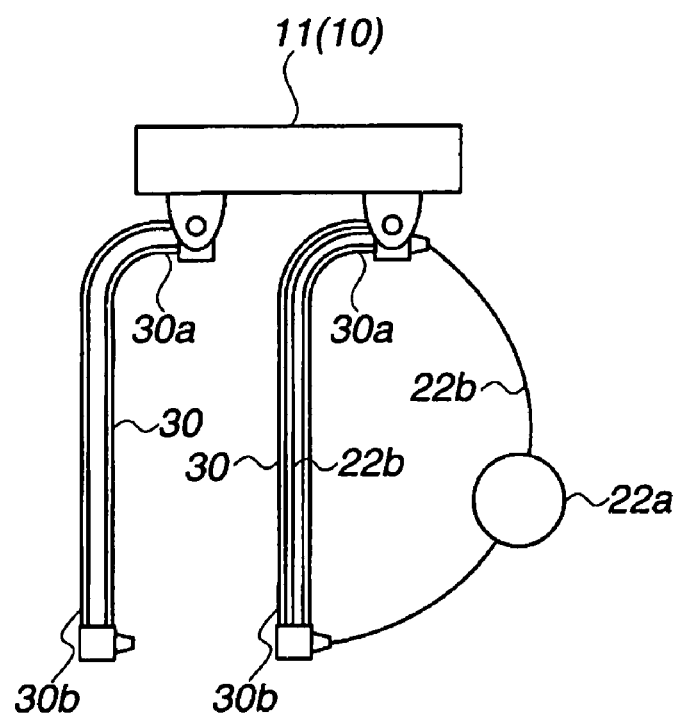
FIG. 9 shows a front view of the guide rail portion of the side air bag system according to the third embodiment, when the side air bag system is positioned in the upper position.

Turning to FIGS. 8 and 9, a side air bag system in accordance with another embodiment of the present invention is shown. In the following, the same components as the embodiments shown in FIGS. 1-7 are denoted by the same reference numbers, and an explanation of these components is omitted. FIG. 8 is a front view of the guide rail portion, when the side air bag system is positioned in the lower position. FIG. 9 is a front view of the guide rail portion, when the side air bag system is positioned in the upper position.

In the embodiment shown in FIGS. 8 and 9, the configuration is basically same as the side air bag systems 10, 10A of the above embodiments. As shown in FIGS. 8 and 9, a position of an upper end portion 30a of a guide rail portion 30 guiding the side air bag system 10 (hoisting plate 23) upward and downward corresponds to the upper position of the side air bag system 10. The guide rail portion 30 may be formed so that the upper end portion 30a is bent or curved in the front-and-rear direction of the vehicle in a position where side air bag system 10 is positioned in the upper position. That is, the upper end portion 30a is curved to be inclined against a deployment direction of the air bag body 11a, and is located or extended in the front-and-rear direction of the vehicle.

As can be seen in FIG. 8, the guide rail portion 30 may be formed of two front and back rails. The upper end portion 30a may be smoothly curved in the rear direction of the vehicle (in the right direction in FIG. 8). More specifically, as illustrated in FIG. 9, the upper end portion 30a may be curved so that when setting the side air bag system 10 to be in the upper position, the air bag module 11 is positioned at the upper end portion 30a of the guide rail portion 30.

In the embodiment shown in FIGS. 8 and 9, in the case where side air bag system 10 is positioned in the upper position, the substantially horizontally located upper end portion 30a in the front-and-rear direction of the vehicle can receive a force that is generated in a direction opposite to the deployment direction of the air bag body 11a at the instant of deployment of the air bag body 11a. Thus, the side air bag system 10 can be prevented from lowering or dropping at the instant of deployment, thereby keeping a height of deployment of the air bag body 11a at an initial setting height. In this manner, protection of the occupant's head can be improved.

In the case where side air bag system 10 is positioned in the lower position, the movement in the lower direction of the side air bag system 10 may be restricted or stopped by the lower end portion 30b of guide rail portion 30. Because of this, even though the force generated in the direction opposite to the deployment direction of the air bag body 11a acts on the side air bag system 10 at the instant of deployment, the dropping of side air bag system 10 can be prevented.

With respect to the structure or shape of the guide rail portion as described in the embodiment of FIGS. 8 and 9, the slit guide rail portion shown in FIGS. 1-5 may be similarly shaped.

In the above embodiments, the description has been generally restricted to the back seat of a vehicle having a convertible roof. Those having ordinary skill in the art will appreciate that one or more advantages of the above embodiments may be achieved at other locations within the vehicle and in other types of vehicles. For example, an air bag system in accordance with embodiments of the present invention can be installed at a back portion or section of a front seat in order to protect the head of the occupant seated in the back seat upon head-on collision of the vehicle. Further, the above embodiments could be applied to an air bag system that is installed at a side portion or section of the front seat in order to protect the head of the occupant seated in the back seat upon side collision or rollover of the vehicle. Moreover, the above embodiments may be applied to an air bag system that is installed in door trim on an interior side of the front seat in order to protect a head of an occupant seated in the front seat upon side collision or rollover of the vehicle, or to an air bag system that is installed inside an instrument panel located at front portion of the interior in order to protect the head of the occupant seated in the front seat upon head-on collision of the vehicle.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An air bag system of a vehicle, the air bag system comprising:
   a side air bag body configured to deploy upon input of shock to the vehicle; and
   an adjustment unit configured to move a position of the side air bag body between a lower position and an upper position;
   wherein the side air bag body is configured to protect an occupant of the vehicle from a side impact to the vehicle in both the upper and the lower positions;
   wherein the adjustment unit is configured to lift the side air bag body to the upper position and lower the side air bag body to the lower position,
   wherein the adjustment unit comprises a guide rail portion guiding the side air bag body upward and downward, and
   wherein an upper end portion of the guide rail portion is arranged to be inclined against a deployment direction of the side air bag body.

2. The air bag system of claim 1, wherein the lower position and the upper position are configured to correspond to an occupant's head position.

3. The air bag system as claimed in claim 1, wherein the air bag system is configured to be installed in a side portion of the vehicle.

4. The air bag system as claimed in claim 1, wherein the air bag system is configured to be installed in a back seat portion of the vehicle.

5. A vehicle comprising the air bag system of claim 1.

6. An air bag system of a vehicle, the air bag system comprising:
   an air bag body configured to deploy upon input of shock to the vehicle; and
   an adjustment unit configured to move a position of the air bag body between a lower position and an upper position,
   wherein the air bag system is configured to be installed inside an interior of a vehicle having a roof that can be opened and closed, and
   wherein the adjustment unit sets a deployment position of the air bag body to the upper position when the roof is opened, and sets the deployment position of the air bag body to the lower position when the roof is closed.

7. The air bag system as claimed in claim 6, wherein the adjustment unit, in response to a roof open/close signal, adjusts the position of the air bag body.

8. An air bag system of a vehicle, the air bag system comprising:
   a side air bag body configured to deploy upon input of shock to the vehicle; and
   an adjustment unit configured to move a position of the side air bag body between a lower position and an upper position;
   wherein the side air bag body is configured to protect an occupant of the vehicle from a side impact to the vehicle in both the upper and the lower positions;
   wherein the adjustment unit is configured to lift the side air bag body to the upper position and lower the side air bag body to the lower position,
   wherein the adjustment unit comprises a guide rail portion guiding the side air bag body upward and downward, and
   wherein a position of an upper end of the guide rail portion corresponds to the upper position of the side air bag body, and the upper end of the guide rail portion is inclined in a horizontal direction.

9. An air bag system of a vehicle, the air bag system comprising:
   a side air bag body configured to deploy upon input of shock to the vehicle; and
   an adjustment unit configured to move a position of the side air bag body between a lower position and an upper position;
   wherein the side air bag body is configured to protect an occupant of the vehicle from a side impact to the vehicle in both the upper and the lower positions;
   wherein the adjustment unit comprises slits guiding the side air bag body upward and downward.

10. An air bag system of a vehicle, the air bag system comprising:
    a side air bag body configured to deploy upon input of shock to the vehicle; and
    an adjustment unit configured to move a position of the side air bag body between a lower position and an upper position;
    wherein the side air bag body is configured to protect an occupant of the vehicle from a side impact to the vehicle in both the upper and the lower positions;
    wherein the adjustment unit comprises a drum configured to raise and lower the side air bag body.

11. A method to deploy a side air bag body disposed in a vehicle, the method comprising:
    adjusting a position of the side air bag body according to a vehicle occupant's head position; and
    deploying the side air bag body in response to a shock to the vehicle;
    wherein the adjusting is in response to an open/close signal for a roof of the vehicle.

12. An air bag system of a vehicle, the air bag system comprising:
    means for deploying a side air bag body in response to a shock to the vehicle; and
    means for adjusting a position of the side air bag body between a lower position and an upper position,
    wherein the side air bag body is configured to protect an occupant of the vehicle from a side impact to the vehicle in both the upper and the lower positions;
    wherein the means for adjusting adjusts the side air bag body between the upper and lower positions in response to an open/close signal of a roof of the vehicle, and
    wherein the roof of the vehicle is operable between an open position and a closed position.

* * * * *